(12) United States Patent
Kayano et al.

(10) Patent No.: US 6,705,971 B2
(45) Date of Patent: Mar. 16, 2004

(54) CONTROL APPARATUS OF AUTOMATIC TRANSMISSION AND METHOD OF CONTROLLING THE SAME

(75) Inventors: Mitsuo Kayano, Hitachi (JP); Toshimichi Minowa, Mito (JP); Tatsuya Ochi, Hitachi (JP); Hiroshi Sakamoto, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/300,018

(22) Filed: Nov. 20, 2002

(65) Prior Publication Data

US 2003/0069107 A1 Apr. 10, 2003

Related U.S. Application Data

(62) Division of application No. 09/792,032, filed on Feb. 26, 2001.

(30) Foreign Application Priority Data

Mar. 30, 2000 (JP) ........................................ 2000-097817

(51) Int. Cl.$^7$ ............................................. B60K 41/02
(52) U.S. Cl. ........................................ 477/110; 477/91
(58) Field of Search ................................. 477/107, 109, 477/110, 90, 91, 115

(56) References Cited

U.S. PATENT DOCUMENTS

| | | | |
|---|---|---|---|
| 4,544,057 A | | 10/1985 | Webster |
| 4,589,302 A | * | 5/1986 | Oda et al. ........... 477/107 |
| 4,716,788 A | * | 1/1988 | Kita ............... 477/52 |
| 4,905,544 A | * | 3/1990 | Ganoung .......... 477/109 |
| 5,091,854 A | | 2/1992 | Yoshimura |
| 5,101,687 A | * | 4/1992 | Iwatsuki et al. ........... 477/109 |
| 5,403,245 A | * | 4/1995 | Watanabe et al. ........... 477/107 |
| 5,580,330 A | * | 12/1996 | Minowa et al. ........... 477/110 |
| 5,643,133 A | * | 7/1997 | Minowa et al. ........... 477/107 |
| 5,669,849 A | | 9/1997 | Tabata |
| 6,024,670 A | * | 2/2000 | Kitagawa et al. ........... 477/109 |
| 6,254,508 B1 | * | 7/2001 | Kojima et al. ........... 477/109 |

FOREIGN PATENT DOCUMENTS

| | | | |
|---|---|---|---|
| EP | 0355576 | 2/1990 | |
| GB | 1375467 | 11/1974 | |
| JP | 61-45163 | 3/1986 | |
| JP | 403168468 | * 7/1991 | ........... 477/109 |
| JP | 405262169 | * 10/1993 | ........... 477/110 |

OTHER PUBLICATIONS

Copy of the European Search Report.

* cited by examiner

*Primary Examiner*—Ha Ho
(74) *Attorney, Agent, or Firm*—Crowell & Moring LLP

(57) ABSTRACT

A control apparatus of an automatic transmission capable of achieving a smooth change of output shaft torque to torque which can be generated by a friction clutch, thus enabling a smooth gear change even if the output shaft torque is high at the gear change. If the output shaft torque exceeds limit transmission output shaft torque obtained by multiplying a torque capacity of the friction clutch by a gear ratio provided for the friction clutch when a gear change command is issued in the automatic transmission, engine torque is controlled so as to make the output shaft torque decreased to the limit transmission output shaft torque, and then the engine torque control is switched when the output shaft torque decreased to the limit transmission output shaft torque to start the gear change operation.

17 Claims, 15 Drawing Sheets

FIG. 4

——— NORMAL GEAR CHANGE ASSIST CLUTCH
(LARGE TORQUE CAPACITY:Tqmax1)

·········· DETERIORATED GEAR CHANGE ASSIST CLUTCH
(SMALL TORQUE CAPACITY:Tqmax2)

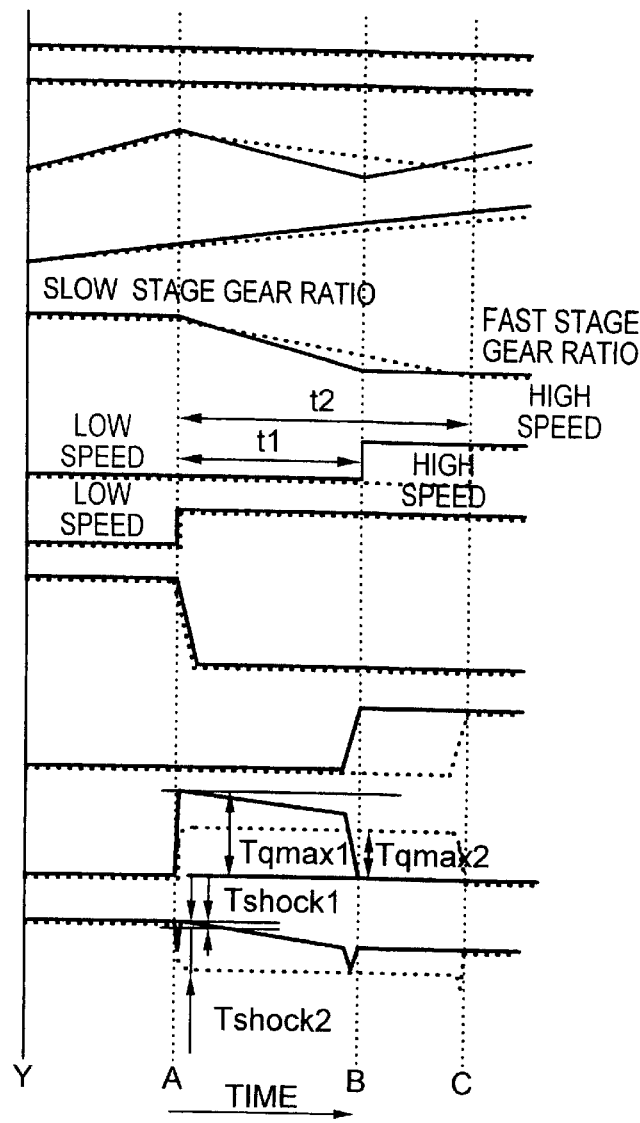

(0) ACCELERATOR PEDAL POSITION
(1) THROTTLE OPENING
(2) ENGINE REVOLUTIONS (INPUT SHAFT REVOLUTION)
(3) OUTPUT SHAFT REVOLUTION (VEHICLE SPEED)
(4) SPEED RATIO (ENGINE REVOLUTION/OUTPUT SHAFT REVOLUTION)
(5) CURRENT GEAR POSITION
(6) TARGET GEAR POSITION
(7) LOW-SPEED DOG CLUTCH TORQUE
(8) HIGH-SPEED DOG CLUTCH TORQUE
(9) GEAR CHANGE ASSIST CLUTCH TORQUE
(10) OUTPUT SHAFT TORQUE

FIG. 5

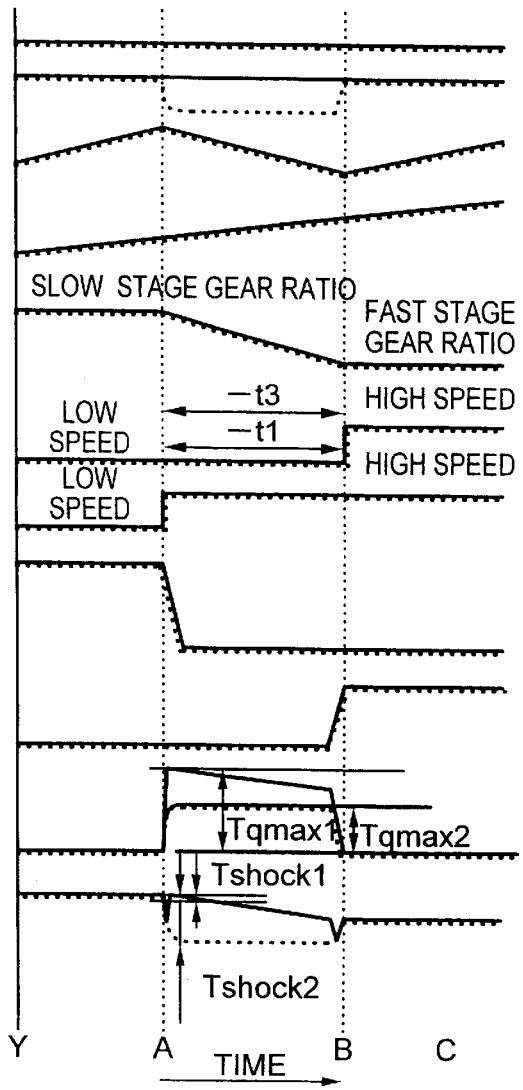

——— NORMAL GEAR CHANGE ASSIST CLUTCH
(LARGE TORQUE CAPACITY:Tqmax1)
············ DETERIORATED GEAR CHANGE ASSIST CLUTCH
(SMALL TORQUE CAPACITY:Tqmax2)

(0) ACCELERATOR PEDAL POSITION
(1) THROTTLE OPENING
(2) ENGINE REVOLUTIONS
    (INPUT SHAFT REVOLUTION)
(3) OUTPUT SHAFT REVOLUTION
    (VEHICLE SPEED)
(4) SPEED RATIO
    (ENGINE REVOLUTIONS
    /OUTPUT SHAFT)
(5) CURRENT GEAR POSITION
(6) TARGET GEAR POSITION
(7) LOW-SPEED DOG CLUTCH
    TORQUE
(8) HIGH-SPEED DOG CLUTCH
    TORQUE
(9) GEAR CHANGE ASSIST
    CLUTCH TORQUE
(10) OUTPUT SHAFT TORQUE

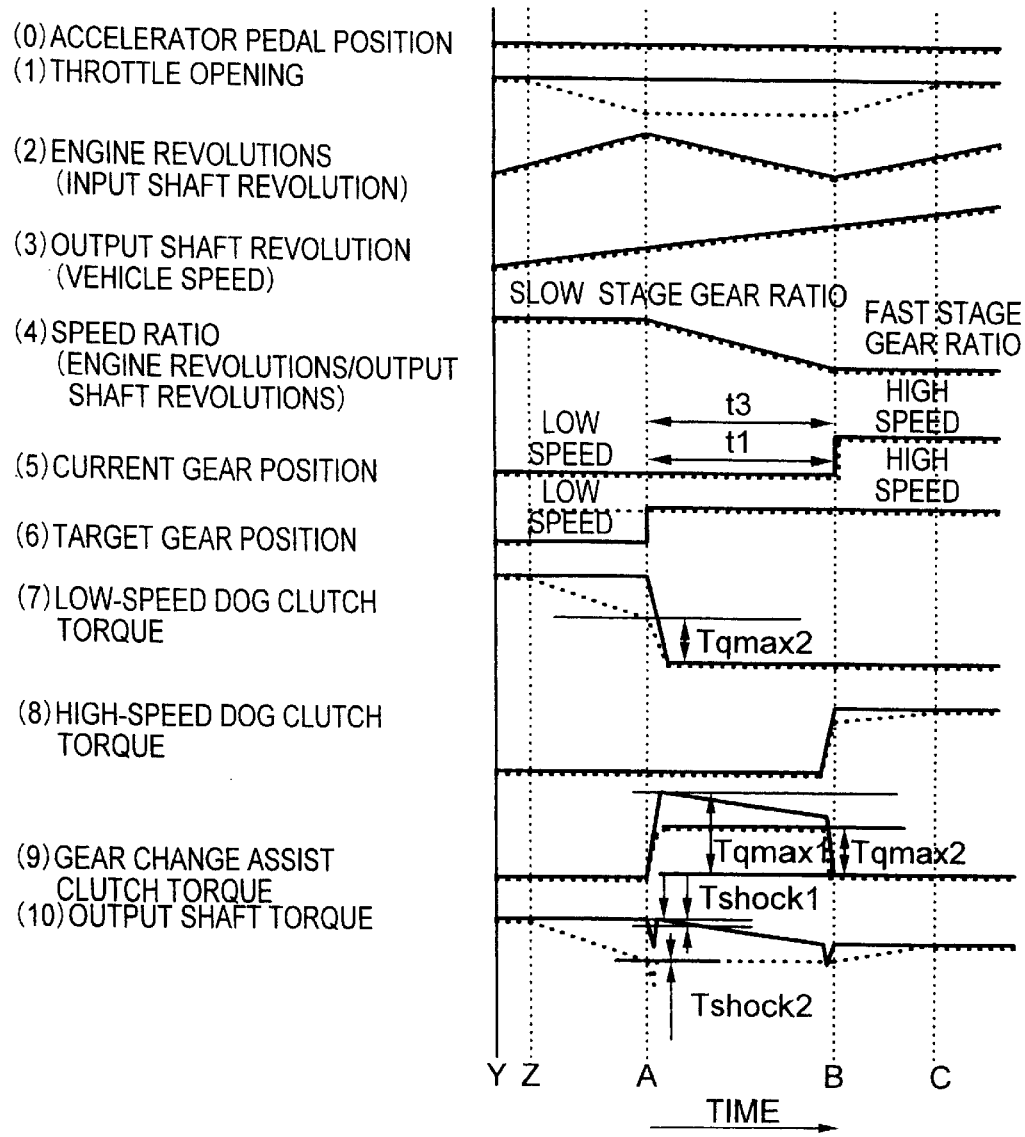

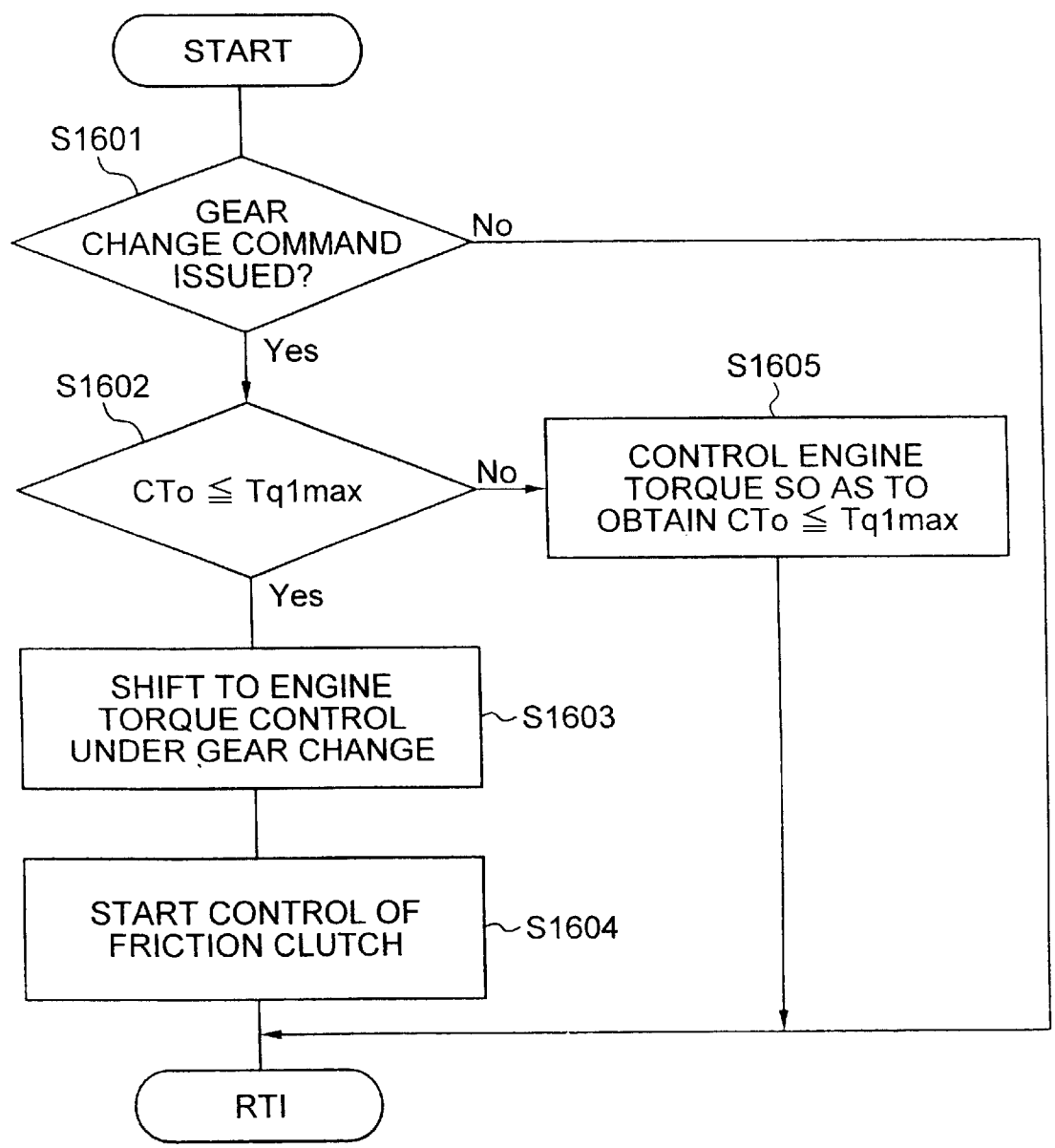

CONTROL APPARATUS OF AUTOMATIC TRANSMISSION AND METHOD OF CONTROLLING THE SAME

This application is a divisional of application Ser. No. 09/792,032, filed Feb. 26, 2001.

BACKGROUND OF THE INVENTION

1. Field of the Invention

The present invention relates to a control apparatus of an automatic transmission having a gear mechanism and a method of controlling the same.

2. Related Background Art

A conventional example of an automatic transmission having a gear transmission mechanism is disclosed in Japanese Patent Unexamined Publication No. 61-45163. In this conventional one, the fastest gear of the gear transmission is locked or released by using a friction clutch, and the engine revolutions are controlled by sliding the friction clutch to change the speed at the gear change operation in synchronization with the revolutions of an output shaft, thus enabling a smooth gear change.

This automatic transmission, however, has a problem that, if the friction clutch has only a small torque capacity, a gear change in a high output shaft torque condition causes a driver and the like to feel odd due to a difference from a torque that can be generated by the friction clutch transmitted as a torque change to the output shaft.

SUMMARY OF THE INVENTION

It is an object of the present invention to provide a control apparatus of an automatic transmission making possible a smooth gear change with a smooth shift of output shaft torque even if output shaft torque is high at the gear change.

Therefore, to solve the above problem in accordance with an aspect of the present invention, there is provided an automatic transmission, having torque transmission means between an input shaft and an output shaft of a gear transmission, the torque transmission means on at least one gear change stage serving as a friction clutch, and the torque transmission means on other gear change stages serving as claw clutches, for changing speed smoothly by controlling the friction clutch at a gear change from one gear change stage to another, wherein, if output shaft torque exceeds limit transmission output shaft torque obtained by a torque capacity of the friction clutch multiplied by a gear ratio provided for the friction clutch when a gear change command is issued in the automatic transmission, engine torque is controlled so that the output shaft torque becomes equal to the limit transmission output shaft torque and then an engine torque control is switched when the output shaft torque reaches the same value as the limit transmission output shaft torque to start to change the speed.

BRIEF DESCRIPTION OF THE DRAWINGS

FIG. 4 is a timing chart of a gear change operation of a gear change assist clutch 225 with large and small torque capacities;

FIG. 5 is an example of a timing chart of a gear change operation for controlling an electronic control throttle during the gear change;

FIG. 6 is an example of a timing chart of a gear change operation for controlling the electronic control throttle before and after the gear change;

FIG. 16 is an example of a control flowchart before the gear change.

DETAILED DESCRIPTION OF THE PREFERRED EMBODIMENTS

The embodiment of the present invention is described below with reference to the accompanying drawings.

Figure 1:
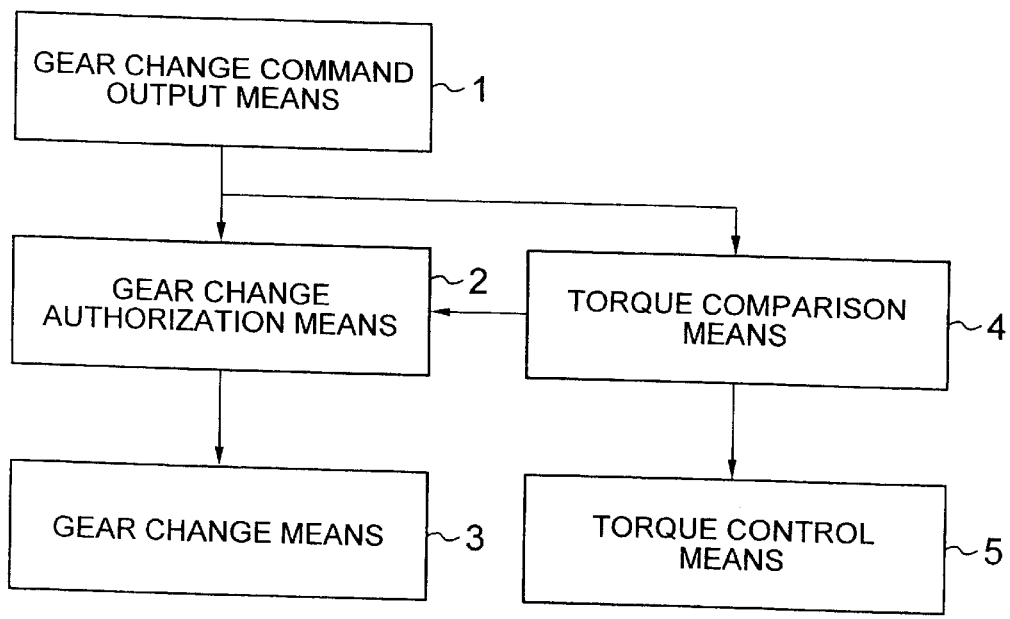
FIG. 1 is a block diagram in starting a gear change of an embodiment of the present invention.

Referring to FIG. 1, there is shown a block diagram, in starting a gear change, of an embodiment of the present invention. If a gear change command is outputted from a gear change command output means 1, a torque comparison means 4 performs to compare the current output shaft torque with limit transmission output shaft torque. If the output shaft torque is larger than the limit transmission output shaft torque, a gear change authorization means 2 does not issue the gear change command to a gear change means 3. A torque control means 5 controls the output shaft torque so as to approximate to the limit transmission output shaft torque. This can achieve that, when the output shaft torque drops to the limit transmission output shaft torque or smaller, the gear change authorization means 2 issues a gear change command to the gear change means to start a gear change. This causes the output shaft torque to shift smoothly, thereby enabling a smooth gear change even if the speed is changed in a high output shaft torque condition.

Figure 2:
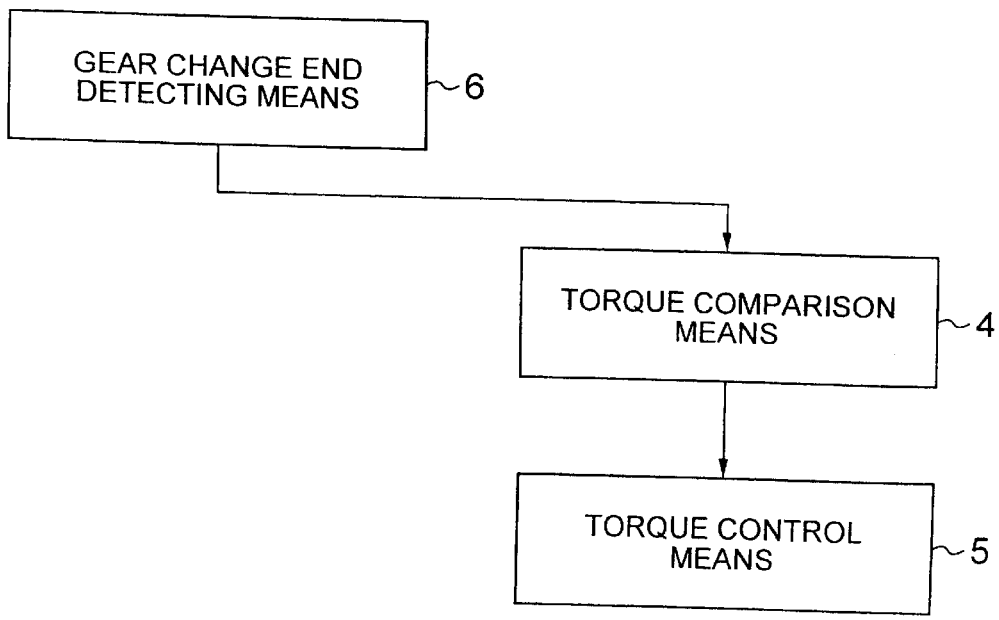
FIG. 2 is a block diagram in completing the gear change of the embodiment of the present invention.

Referring to FIG. 2, there is shown a block diagram, in completing the gear change, of the embodiment of the present invention. When gear change end detecting means 6 outputs a gear change end signal, the torque comparison means 4 compares the current output shaft torque with target output shaft torque. Unless the output shaft torque is equal to the target output shaft torque, the torque control means 5 controls the output shaft torque so as to approximate to the target output shaft torque. This causes the output shaft torque to shift smoothly, thus enabling a smooth gear change even if the output shaft torque at the completion of the gear change differs from the target output shaft torque.

Figure 3:
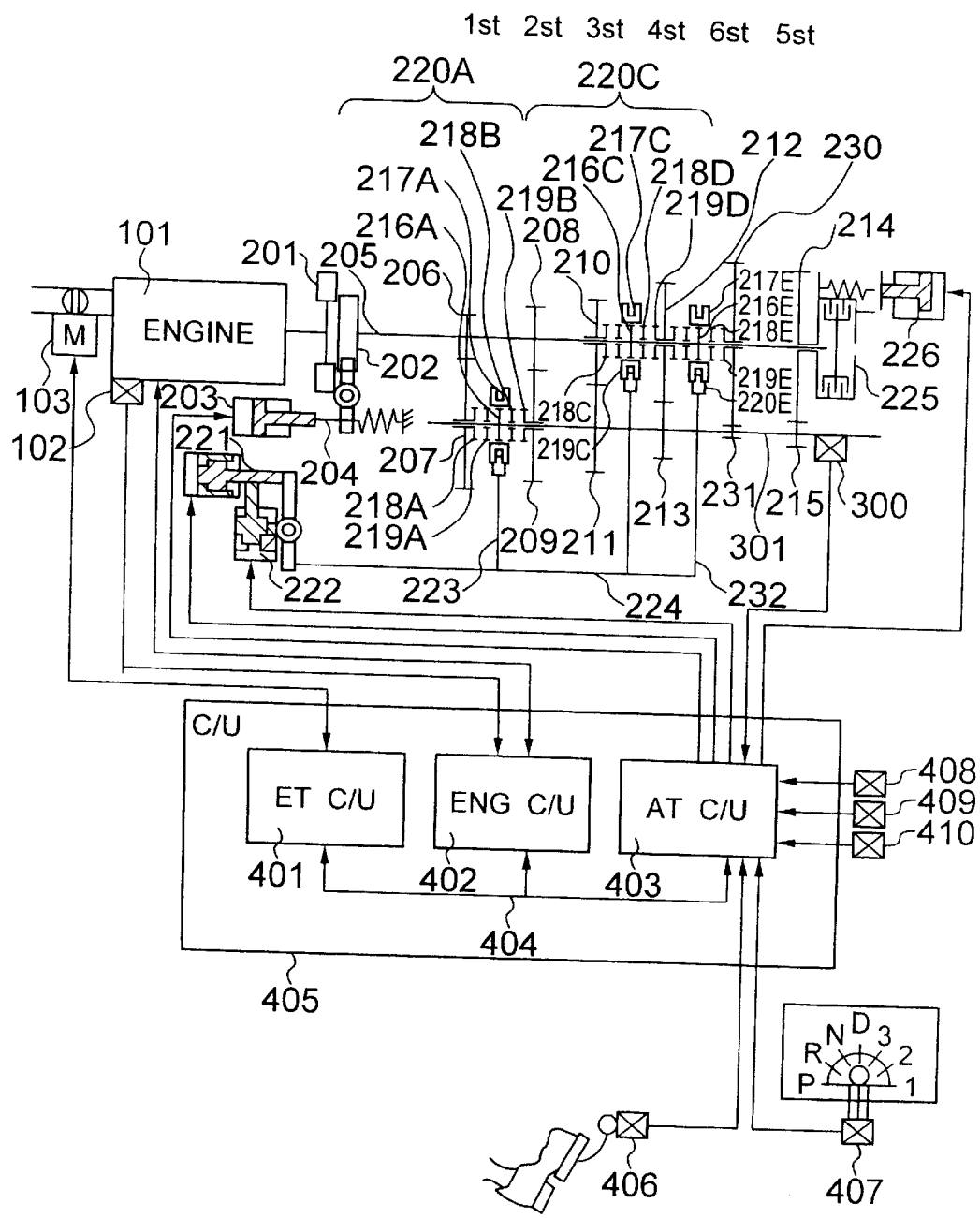
FIG. 3 is an example of a detailed entire configuration of an automobile using a control apparatus for the automobile according to the present invention.

Referring to FIG. 3, there is shown an example of an entire detailed configuration of an automobile using a control apparatus of the automobile according to the present invention. In the example shown in FIG. 3, an engine is used as a power generator and a gear transmission is used as power transmitting means.

A control unit 405 includes an electronic control throttle control unit 401 for controlling an electronic control throttle 103, an engine control unit 402 for controlling the engine, and a transmission control unit 403 for controlling the transmission.

The engine 101 includes the electronic control throttle 103 for adjusting engine torque and an engine revolutions sensor 102 for detecting engine revolutions. The engine 101 is controlled by an engine control unit 402. The electronic control throttle 103 is controlled by an electronic control throttle control unit 401.

The gear transmission is constructed to include a starting clutch 202, a starting clutch actuator 203, a wire 204, an input shaft 205, an output shaft 301, gears 206, 207, 208, 209, 210, 211, 212, 213, 214, 215, 230, and 231, a 1- to 2-speed dog clutch 220A, a 3- to 4-speed dog clutch 220C, a 6-speed dog clutch 220E, a shift actuator 221, a select actuator 222, shifter forks 223, 224, and 232, a gear change assist clutch 225, a gear change assist clutch actuator 226, and an output shaft revolutions sensor 300. The 1- to 2-speed dog clutch 220A comprises a clutch hub 216A, a sleeve 217A, synchronizer rings 218A and 218B, and gear splines 219A and 219B. The 3- to 4-speed dog clutch 220C includes a clutch hub 216C, a sleeve 217C, synchronizer rings 218C and 218D, and gear splines 219C and 219D. The 6-speed dog clutch 220E includes a clutch hub 216E, a sleeve 217E, a synchronizer ring 218E, and a gear spline 219E. A reverse mechanism is omitted in this diagram.

Actuators 203, 221, 222, and 226 composing the gear transmission are controlled by the transmission control unit 403 with an oil pressure or a motor.

Engine torque outputted from the engine 101 is transmitted to the input shaft 205 of the gear transmission via the flywheel 201 and the starting clutch 202, transmitted to the output shaft 301 via any one of the gears 206, 207, 208, 209, 210, 211, 212, 213, 214, 215, 230, and 231, and finally transmitted to tires to run the automobile. The starting clutch 202 for transmitting the engine torque to the input shaft 205 of the gear transmission is locked or released by the starting clutch actuator 203 to control transmissibility of the engine torque.

Traveling of one of the 1- to 4-speed and 6-speed is determined by moving any one of the gears 210, 212, and 230 rotatable to the input shaft 205 or one of the gears 207 and 209 rotatable to the output shaft 301 with moving sleeves 217A, 217C, 217E of the claw clutches 220A, 220C, and 220E (for example, dog clutches) by means of the shifter forks 223, 224, and 232 to cause one of the clutch hubs 216A, 216C, and 216E to be fastened to one of the gear splines 219A, 219B, 219C, 219D, and 219E. The shifter forks 223, 224, and 232 are driven by the shift actuator 221 and the select actuator 222. At this time in order to synchronize the clutch hubs 216A, 216C, and 216E with the gear splines 219A, 219B, 219C, 219D, and 219E, there are provided the synchronizer rings 218A, 218B, 218C, 218D, and 218E.

At the 1-speed traveling, a drive shaft torque of the input shaft 205 is transmitted to the output shaft 301 via the gear 206, the gear 207, and the clutch hub 216A. The gear 207 is coupled to the clutch hub 216A through the sleeve 217A. At the 2-speed traveling, the drive torque of the input shaft 205 is transmitted to the output shaft 301 via the gear 208, the gear 209, and the clutch hub 216A. The gear 209 is coupled to the clutch hub 216A through the sleeve 217A. At the 3-speed traveling, the drive torque of the input shaft 205 is transmitted to the output shaft 301 via the clutch hub 216C, the gear 210, and the gear 211. The gear 210 is coupled to the clutch hub 216C through the sleeve 217C. At the 4-speed traveling, the drive torque of the input shaft 205 is transmitted to the output shaft 301 via the clutch hub 216C, the gear 212, and the gear 214. The gear 212 is coupled to the clutch hub 216C through the sleeve 217C. At the 6-speed traveling, the drive torque of the input shaft 205 is transmitted to the output shaft 301 via the clutch hub 216E, the gear 230, and the gear 231. The gear 230 is coupled to the clutch hub 216E through the sleeve 217E. In this manner, the dog clutches 220A, 220C, and 220E are provided for each of the 1- to 4-speed and the 6-speed gears. During traveling, only one gear should be necessarily fastened by the dog clutches 220A, 220C, and 220E and other gears should be released.

At the 5-speed traveling, the input shaft 205 is fastened to the gear 214 with the gear change assist clutch 225 before traveling. The gear change assist clutch 225 is driven by the gear change assist clutch actuator 226. During gear shift, the gear change assist clutch 225 is controlled to control the transmission torque, thereby preventing a sense of weakness or an occurrence of blowoff.

The transmission control unit 403 receives inputs of automobile sensor signals from an accelerator pedal sensor 406 for detecting an accelerator depression amount, an inhibitor switch 407 for detecting a shift lever position, the output shaft revolutions sensor 300 for detecting the revolutions of the output shaft, a mode switch 408 for changing between an automatic transmission mode and a manual transmission, a plus switch 409 for incrementing the gear change stage by one in the manual transmission mode, and a minus switch 410 for decrementing the gear change stage by one in the manual transmission mode. The transmission control unit 403 is coupled to the engine control unit 402 and to the electronic control throttle control unit 401 via a communication line 404 such as control area network (CAN).

The transmission control unit 403 keeps up on an operational condition on the basis of received signals and controls a starting clutch condition and a gear position to the appropriate ones. The starting clutch 202 controls fastening during fixed-speed traveling or gear change. The transmission control unit 403 controls the electronic control throttle 103 via the electronic control throttle control unit 401 so as to prevent the engine 101 from blowing out during gear change in the automatic transmission mode. In addition the transmission control unit 403 controls the electronic control throttle 103 and the gear change assist clutch 225 for a smooth change from transmission torque immediately before the gear change to transmission torque immediately after the gear change. Furthermore, it sends a correction value for an ignition timing from the transmission control unit 403 to the engine control unit 402 to control the ignition timing. If the output shaft torque before the gear change is greater than limit transmission output shaft torque obtained by multiplying a torque capacity of the gear change assist clutch 225 by 5-speed gear ratio, the electronic control throttle 103 is controlled to absorb the shock caused by a rapid gear change before and after the gear change so as to reduce a sense of discomfort for a driver.

Referring to FIG. 4, there is shown an example of a timing chart of a gear change operation for the gear change assist clutch 225 with large and small torque capacities. Assuming that a low speed corresponds to 1-speed and a high speed to 2-speed, a solid line indicates operations of respective components of a gear change assist clutch having a large torque capacity and a phantom line indicates operations of respective components of a gear change assist clutch having a small torque capacity in the sample gear change of an upshift from the 1-speed to the 2-speed. The abscissa axis corresponds to time. An accelerator pedal position (0) is assumed to be fixed. A throttle opening (1) is assumed to be a function of the accelerator pedal position. For example, the throttle opening TVO is expressed by an equation "TVO=a * accelerator depression amount APS+b" (a and b are constants). Assuming that the throttle opening (1) is fixed during a period from time t0 to time A, engine revolutions (2) and output shaft revolutions (vehicle speed) (3) are increased. If the gear change conditions are fulfilled when the vehicle speed reaches the predetermined speed, a target gear position (6) changes from the 1-speed to the 2-speed at time A to start the gear change operation. The start of the gear change sets 0 to low-speed dog clutch torque (7), with the dog clutch of the 1-speed. At this time, a push load on the gear change assist clutch 225 is increased to transmit gear change assist clutch torque (9) to the output shaft. This push load, which is obtained based on engine torque characteristics, is controlled so that the output shaft torque before a start of the gear change smoothly shifts to the output shaft torque after a completion of the gear change. This control results in a small torque variation of the output shaft torque (10) as Tshock1 in the case of the torque capacity Tqmax1 with the gear change operation completed at time t1. On the other hand, if the torque capacity is Tqmax2 smaller than Tqmax1, the torque variation of the output shaft torque (10) is large as shown in Tshock2 with the gear change operation completed at time t2 later than the time t1. If the torque capacity of the gear change assist clutch is smaller than the output shaft torque as described above, the gear change shock is large and the gear change time is extended, thereby causing a driver to feel odd.

To solve this problem, there is a method of controlling an electronic control throttle during the gear change operation. Referring to FIG. 5, there is shown an example of a timing chart of a gear change operation for controlling the electronic control throttle during the gear change. The operation up to the time A is the same as for one in FIG. 4. The throttle opening (1) is controlled so as to decrease the engine revolutions (2) quickly from the time A. This results in the gear change operation time of time t3, thus enabling the gear change operation time to be reduced. The gear change shock, however, is the same as the foregoing method and causes a driver to feel odd. The small torque capacity necessarily causes a torque reduction during the gear change in this manner. Therefore in this condition, the electronic control throttle is controlled before and after the gear change so as to minimize variations of the output shaft torque in a short period of time around the gear change. Referring to FIG. 6, there is shown an example of a timing chart of a gear change operation for controlling the electronic control throttle before and after the gear change. When a gear change command is issued, the throttle opening is controlled to drop the output shaft torque smoothly as indicated by a phantom line from time Z to time A. After that, when the output shaft torque drops to a limit transmission output shaft torque Tqmax2 at the time A, the low-speed dog clutch torque is decreased. During the gear change operation, a control operation is performed in the same manner as for one in FIG. 5. After a completion of the gear change at time B, the throttle opening is smoothly returned to one for the target output shaft torque. When the target output shaft torque is obtained at time C, the throttle opening is assumed to be a function of the accelerator pedal position. This control results in a smooth shift of the output shaft torque, thus enabling a smooth gear change even if the output shaft torque is high at the gear change.

Figure 7:
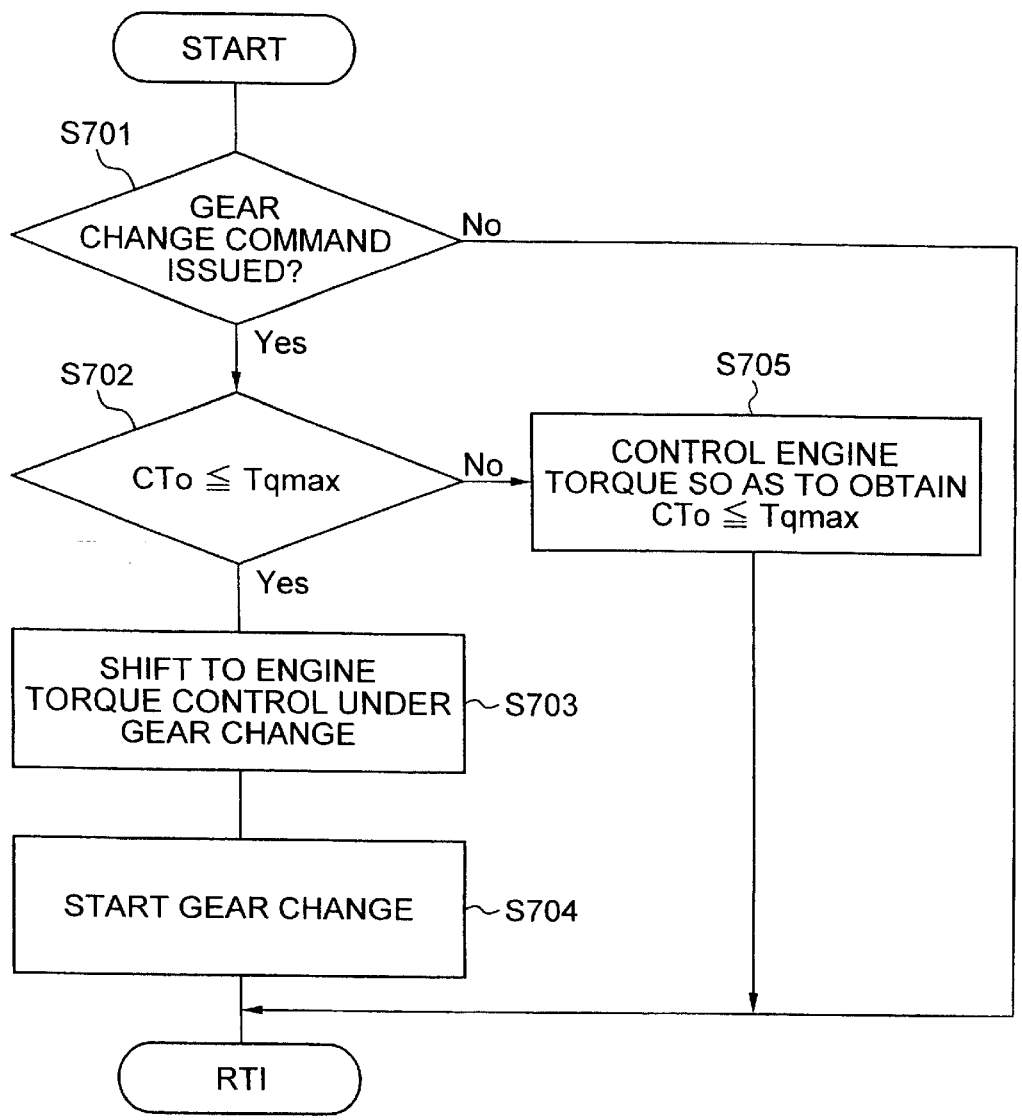
FIG. 7 is an example of a control flowchart before the gear change.

Referring to FIG. 7, there is shown an example of a control flowchart before the gear change. Processing in this flowchart is started at a fixed period on a timer (for example, 10 [ms]). Whether the gear change command is issued is determined in step S701; none is executed unless the command is issued or otherwise the processing progresses to step S702. In the step S702, it is determined whether a current output shaft torque CTo is equal to or smaller than limit transmission output shaft torque Tqmax obtained by multiplying a torque capacity of a gear change assist clutch by a 5-speed gear ratio. If the current output shaft torque is greater than the limit transmission output shaft torque, the processing progresses to step S705 to control the engine torque so that the current output shaft torque decreased to the limit transmission output shaft torque or smaller. If the current output shaft torque is equal to or smaller than the limit transmission output shaft torque, the processing progresses to step S703 to shift to the engine torque control under the gear change and the gear change is started in step S704. This results in a smooth change of the output shaft torque, thereby enabling a smooth gear change even if the output shaft torque before the gear change is greater than the limit transmission output shaft torque.

Figure 8:
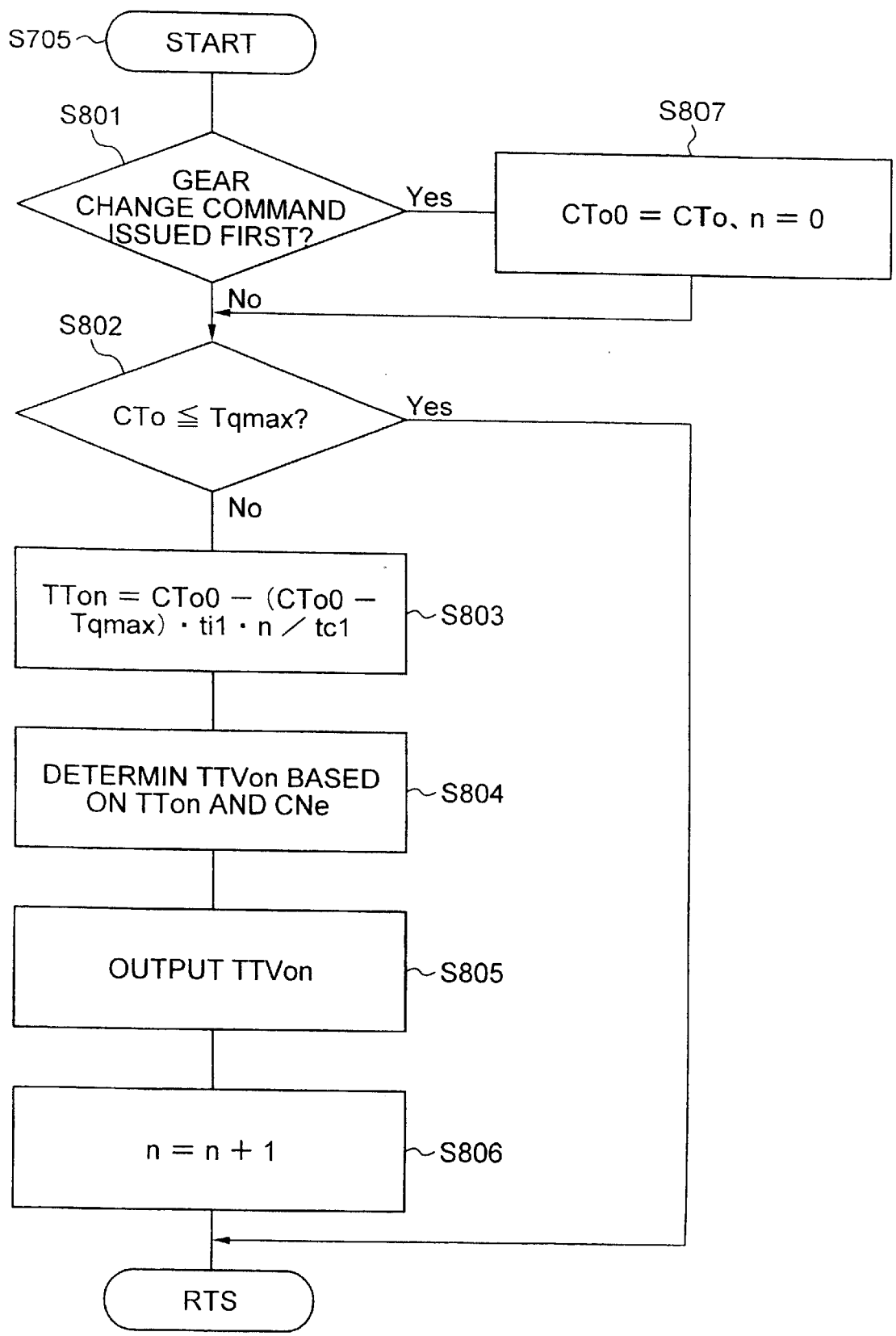
FIG. 8 is an example of an engine torque control performed in step S705 in FIG. 7.

Referring to FIG. 8, there is shown an example of an engine torque control operation performed in step S705 in FIG. 7. In step S801, it is determined whether the engine torque control operation is started for the first time after the gear change command is issued. If it is the first time, in step S807 the current output shaft torque CTo at the time when the gear change command is issued is incorporated as an initial value CTo0 and a counter n is initialized to 0. In step S802, it is determined whether the current output shaft torque CTo is equal to or smaller than the limit transmission output shaft torque Tqmax obtained by multiplying the torque capacity of the gear change assist clutch by the 5-speed gear ratio. If the current output shaft torque is greater than the limit transmission output shaft torque, target output shaft torque TTon is evaluated by an equation (1) in step S803, where ti1 indicates a period (for example, 10 [ms]) at which the operation in the step S705 is started and tc1 indicates a control time (for example, 200 [ms]) before the gear change.

$$TTon = CTo0 - (CTo0 - Tqmax) \cdot ti1 \cdot n / tc1 \qquad (1)$$

In step S804, a target throttle opening TTVOn is determined on the basis of the target output shaft torque TTon and the current engine revolutions CNe. In step S805, a command is issued so that the current throttle opening is equal to the determined target throttle opening TTVOn. In step S806, the counter n is incremented. This results in a smooth change of the output shaft torque, thus enabling a smooth gear change even if the output shaft torque before the gear change is greater than the limit transmission output shaft torque.

Figure 9:
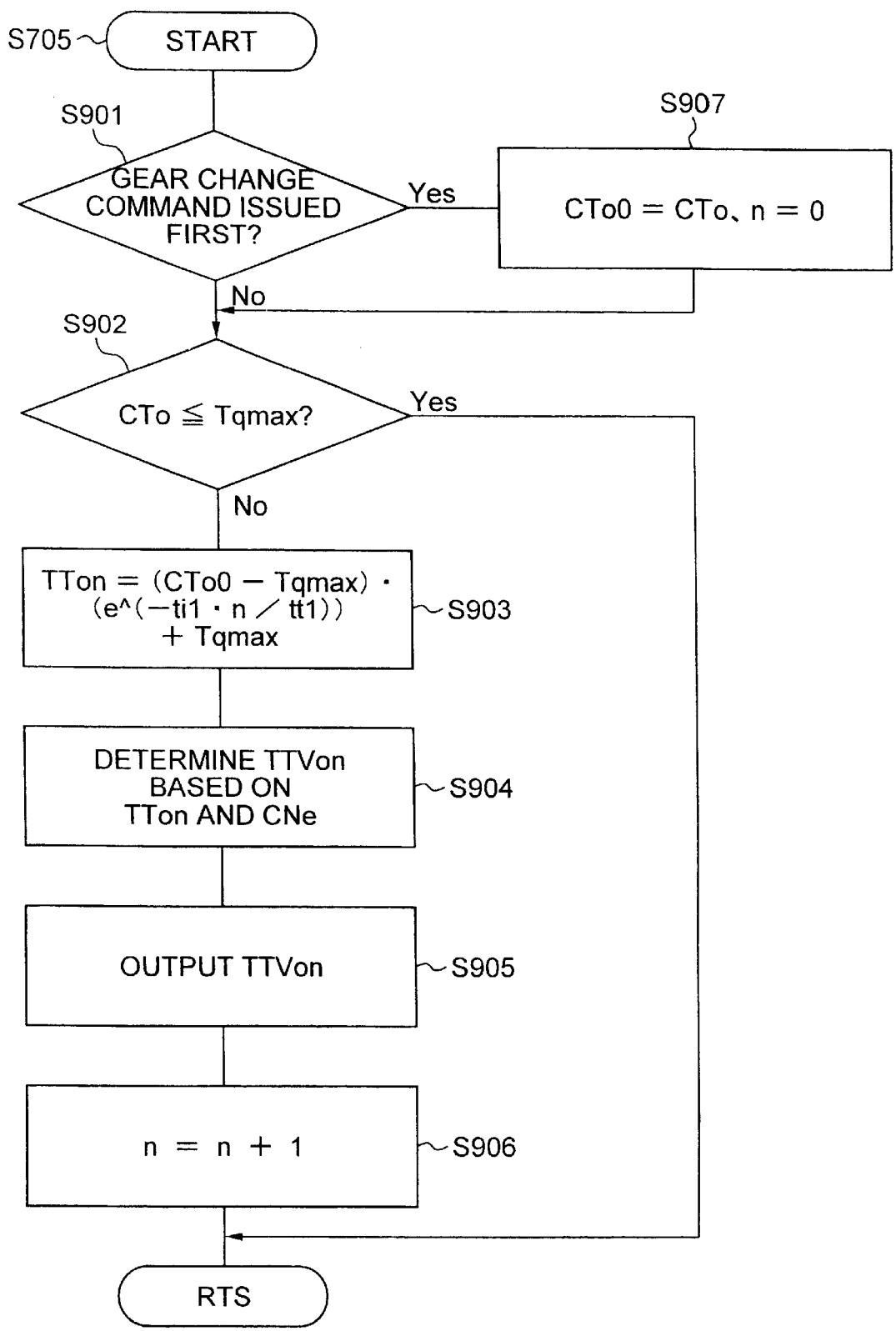
FIG. 9 is an example of an engine torque control performed in step S705 in FIG. 7.

Referring to FIG. 9, there is shown an example of an engine torque control operation performed in the step S705 in FIG. 7. In step S901, it is determined whether the engine torque control operation is started for the first time after the gear change command is issued. If it is the first time, in step S907 the current output shaft torque CTo at the time when the gear change command is issued is incorporated as an initial value CTo0 and the counter n is initialized to 0. In step S902, it is determined whether the current output shaft torque CTo is equal to or smaller than the limit transmission output shaft torque Tqmax obtained by multiplying the torque capacity of the gear change assist clutch by the 5-speed gear ratio. If the current output shaft torque is greater than the limit transmission output shaft torque, target output shaft torque TTon is evaluated by an equation (2) in step S903, where ti1 indicates a period (for example, 10 [ms]) at which the operation in the step S705 is started and tt1 indicates a time constant (for example, 200 [ms]).

$$TTon=(CTo0-Tqmax)\cdot(e^{\wedge}(-ti1\cdot n/tt1))+Tqmax \qquad (2)$$

In step S904, a target throttle opening TTVOn is determined on the basis of the target output shaft torque TTon and the current engine revolutions CNe. In step S905, a command is issued so that the current throttle opening is equal to the determined target throttle opening TTVOn. In step S906, the counter n is incremented. This results in a smooth change of the output shaft torque, thus enabling a smooth gear change even if the output shaft torque before the gear change is greater than the limit transmission output shaft torque.

Figure 10:
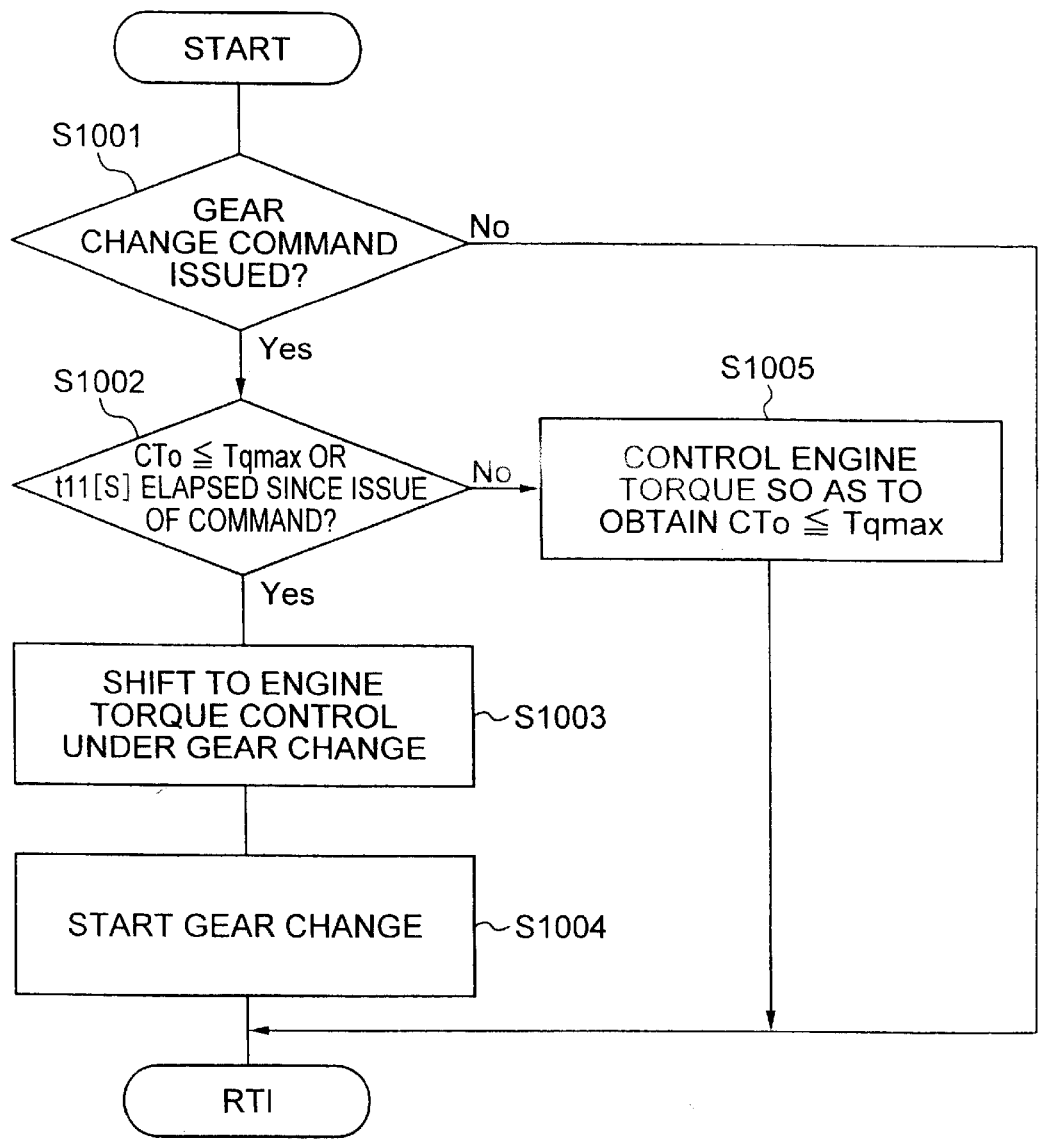
FIG. 10 is an example of a control flowchart before the gear change.

Referring to FIG. 10, there is shown an example of a control flowchart before the gear change. Processing in this flowchart is started at a fixed period on the timer (for example, 10 [ms]). Whether the gear change command is issued is determined in step S1001; none is performed unless the command is issued or otherwise the processing progresses to step S1002. In the step S1002, it is determined whether the current output shaft torque CTo is equal to or smaller than the limit transmission output shaft torque Tqmax obtained by multiplying the torque capacity of the gear change assist clutch by the 5-speed gear ratio or whether the time tl1 [s] or more has already elapsed since the gear change command is issued. If the current output shaft torque is greater than the limit transmission output shaft torque and a time tl1 [s] has not elapsed yet since the gear change command is issued, the processing progresses to step S1005 to control the engine torque so that the current output shaft torque decreased to the limit transmission output shaft torque or smaller. If the current output shaft torque is equal to or smaller than the limit transmission output shaft torque or the time tl1 [s] has already elapsed since the gear change command is issued, the processing progresses to step S1003 to shift to the engine torque control under the gear change and the gear change is started in step S1004. This results in a smooth change of the output shaft torque, thereby enabling a smooth gear change even if the output shaft torque before the gear change is greater than the limit transmission output shaft torque. The limit transmission output shaft torque Tqmax set forth in the above necessarily need not be the value obtained by multiplying the torque capacity of the gear change assist clutch by the 5-speed gear ratio, but it is possible to use a value equal to or smaller than the limit transmission output shaft torque Tqmax for the control.

Figure 11:
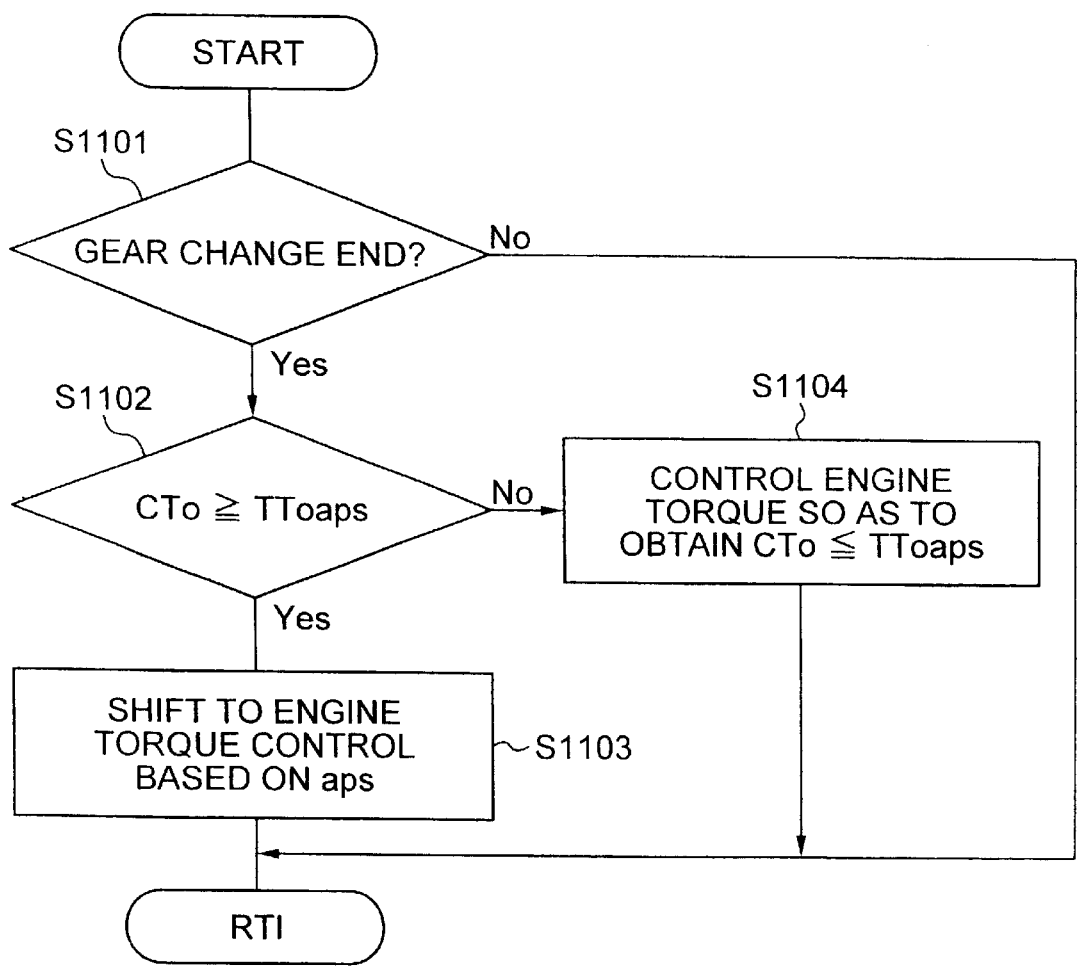
FIG. 11 is an example of a control flowchart after the gear change.

Referring to FIG. 11, there is shown an example of a control flowchart after the gear change. Processing in this flowchart is started at a fixed period on the timer (for example, 10 [ms]). Whether the gear change is completed is determined in step S1101; none is executed unless it is completed or otherwise the processing progresses to step S1102. In the step S1102, it is determined whether the current output shaft torque CTo is equal to or greater than target output shaft torque Ttoaps evaluated based on the current accelerator pedal position. If the current output shaft torque is smaller than the target output shaft torque, the processing progresses to step S1104 to control the engine torque so that the current output shaft torque increases to the target output shaft torque or higher. If the current output shaft torque is equal to or greater than the target output shaft torque, the processing progresses to step S1103 to shift to the engine torque control based on the accelerator pedal position. This results in a smooth change of the output shaft torque, thereby enabling a smooth gear change even if the output shaft torque after the gear change is smaller than the target output shaft torque based on the accelerator pedal.

Figure 12:
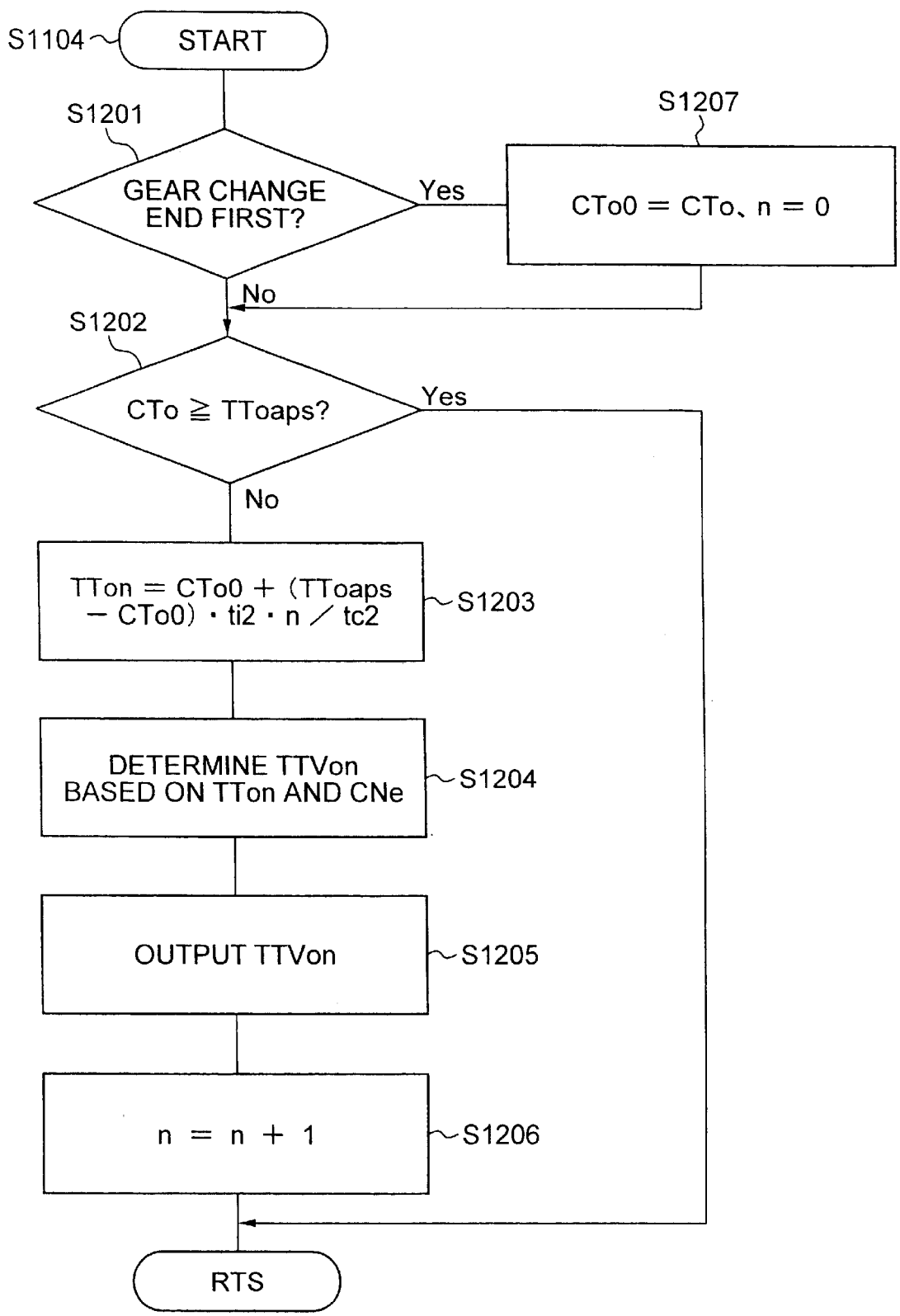
FIG. 12 is an example of an engine torque control performed in step S1105 in FIG. 11.

Referring to FIG. 12, there is shown an example of an engine torque control operation performed in step S1104 in FIG. 11. In step S1201, it is determined whether the engine torque control operation is started for the first time after the completion of the gear change. If it is the first time, in step S1207 the current output shaft torque CTo at the time when the gear change is completed is incorporated as an initial value CTo0 and the counter n is initialized to 0. In step S1202, it is determined whether the current output shaft torque CTo is equal to or greater than the target output shaft torque TToaps obtained based on the accelerator pedal position. If the current output shaft torque is smaller than the target output shaft torque, the target output shaft torque TTon is evaluated by an equation (3) in step S1203, where ti2 indicates a period (for example, 10 [ms]) at which the operation in the step S1104 is started and tc2 indicates a control time (for example, 200 [ms]) after the gear change.

$$TTon=CTo0+(TToaps-CTo0)ti2\cdot n/tc2 \qquad (3)$$

In step S1204, a target throttle opening TTVOn is determined on the basis of the target output shaft torque TTon and the current engine revolutions CNe. In step S1205, a command is issued so that the current throttle opening is equal to the determined target throttle opening TTVOn. In step S1206, the counter n is incremented. This results in a smooth change of the output shaft torque, thus enabling a smooth gear change even if the output shaft torque after the gear change is smaller than the target output shaft torque based on the accelerator pedal.

Figure 13:
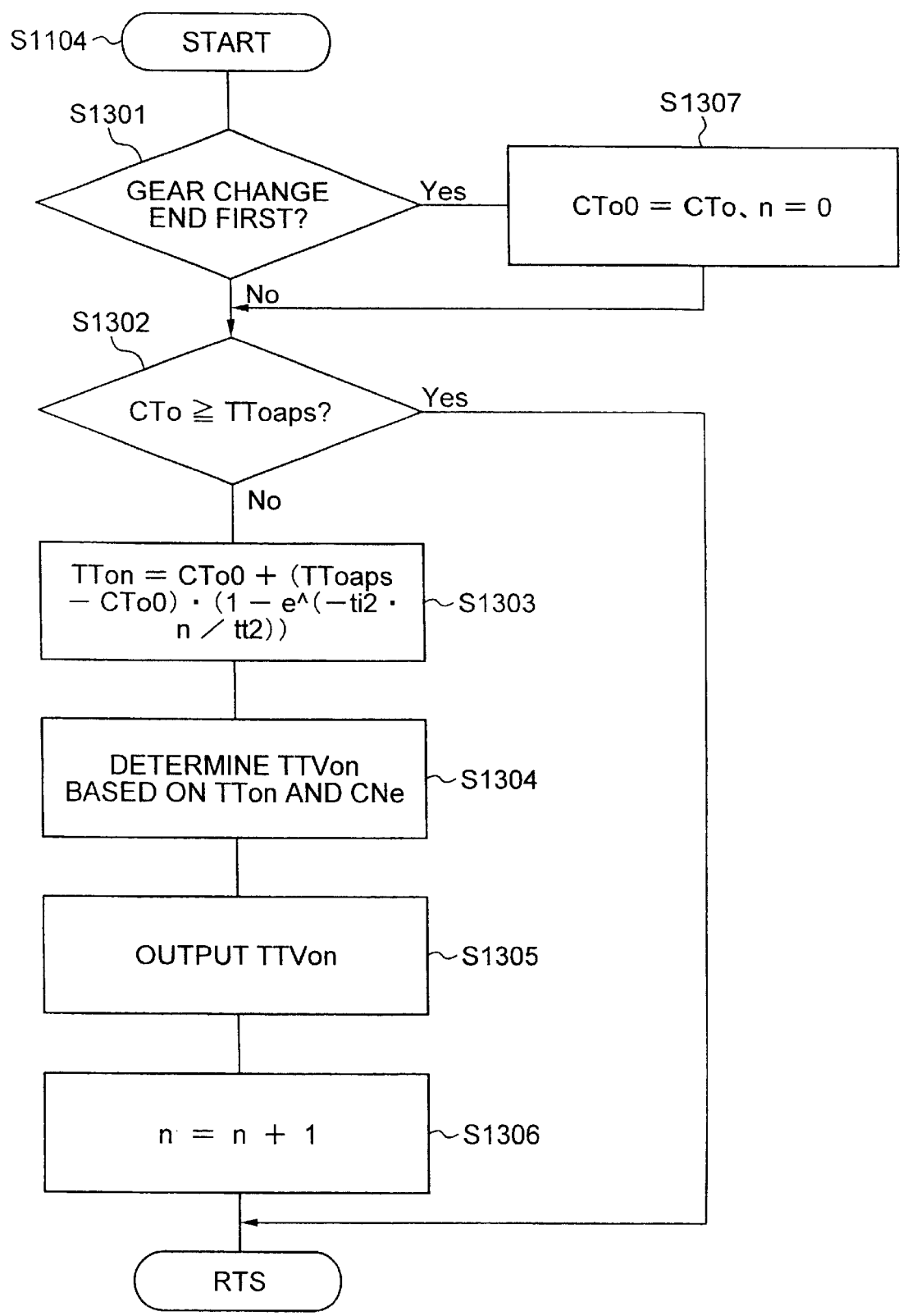
FIG. 13 is an example of an engine torque control performed in step S1105 in FIG. 11.

Referring to FIG. 13, there is shown an example of an engine torque control operation performed in the step S1104 in FIG. 11. In step S1301, it is determined whether the engine torque control operation is started for the first time after the gear change is completed. If it is the first time, in step S1307 the current output shaft torque CTo at the time when the gear change is completed is incorporated as an initial value CTo0 and the counter n is initialized to 0. In step S1302, it is determined whether the current output shaft torque CTo is equal to or greater than the target output shaft torque TToaps obtained based on the accelerator pedal position. If the current output shaft torque is smaller than the target output shaft torque, the target output shaft torque TTon is evaluated by an equation (4) in step S1303, where ti2 indicates a period (for example, 10 [ms]) at which the operation in the step S1104 is started and tt2 indicates a time constant (for example, 200 [ms]).

$$TTon=CTo0+(TToaps-CTo0)\cdot(1-e^{\wedge}(-ti2\cdot n/tt2)) \qquad (4)$$

In step S1304, a target throttle opening TTVOn is determined on the basis of the target output shaft torque TTon and the current engine revolutions CNe. In step S1305, a command is issued so that the current throttle opening is equal to the determined target throttle opening TTVOn. In step S1306, the counter n is incremented. This results in a smooth change of the output shaft torque, thus enabling a smooth gear change even if the output shaft torque after the gear change is smaller than the target output shaft torque based on the accelerator pedal.

Figure 14:
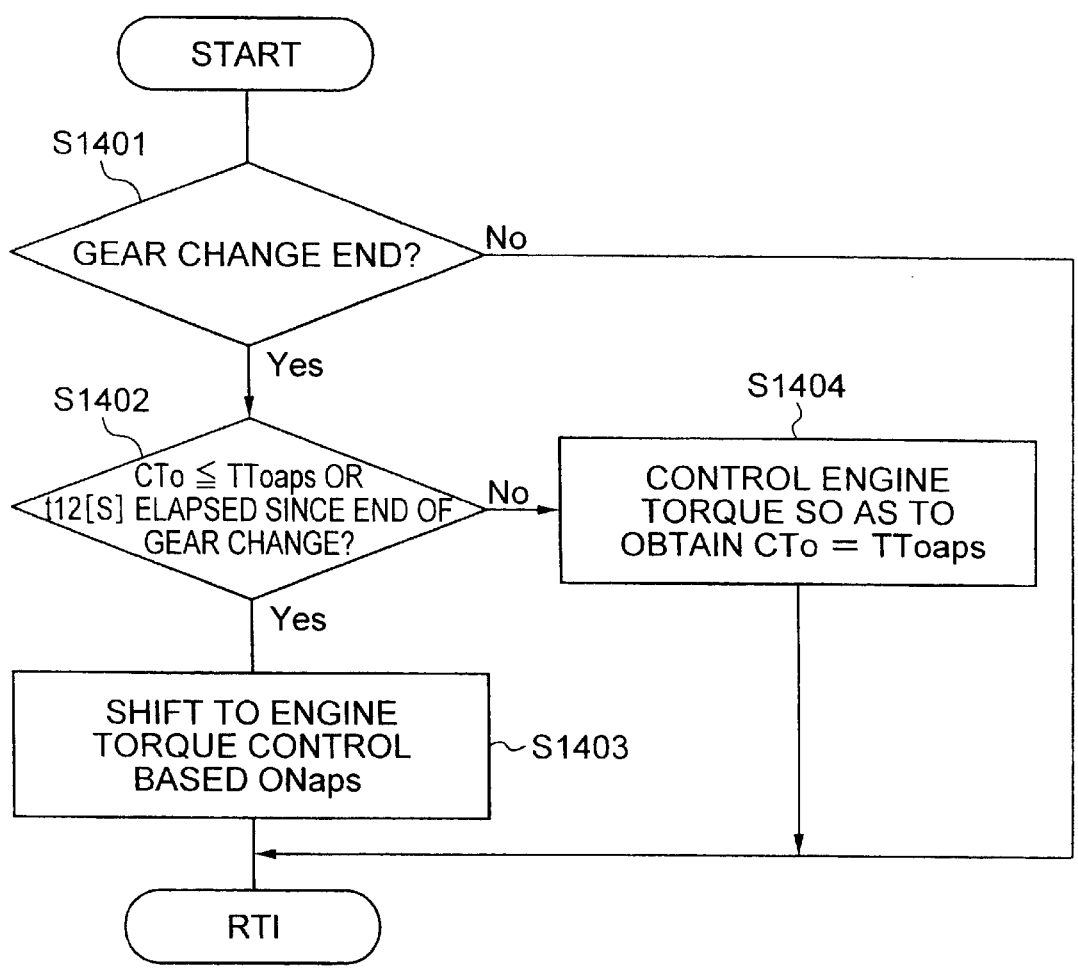
FIG. 14 is an example of a control flowchart after the gear change.

Referring to FIG. 14, there is shown an example of a control flowchart after the gear change. Processing in this flowchart is started at a fixed period on the timer (for example, 10 [ms]). Whether the gear change is completed is determined in step S1401; none is executed unless the gear change is completed or otherwise the processing progresses to step S1402. In the step S1402, it is determined whether the current output shaft torque CTo is equal to or greater than the target output shaft torque TToaps obtained based on the accelerator pedal position or whether the time tl2 [s] or more has already elapsed since the completion of the gear change. If the current output shaft torque is smaller than the target output shaft torque and a time tl2 [s] has not elapsed yet since the completion of the gear change, the processing progresses to step S1404 to control the engine torque so that the current output shaft torque decreased to the target output shaft torque or smaller. If the current output shaft torque is equal to or greater than the target output shaft torque or the time tl2 [s] has already elapsed since the completion of the gear change, the processing progresses to step S1403 to shift to the engine torque control under the gear change. This results in a smooth change of the output shaft torque, thereby enabling a smooth gear change even if the output shaft torque after the gear change is smaller than the target output shaft torque based on the accelerator pedal. Each torque in FIGS. 7 to 14 can be replaced by acceleration.

Figure 15:
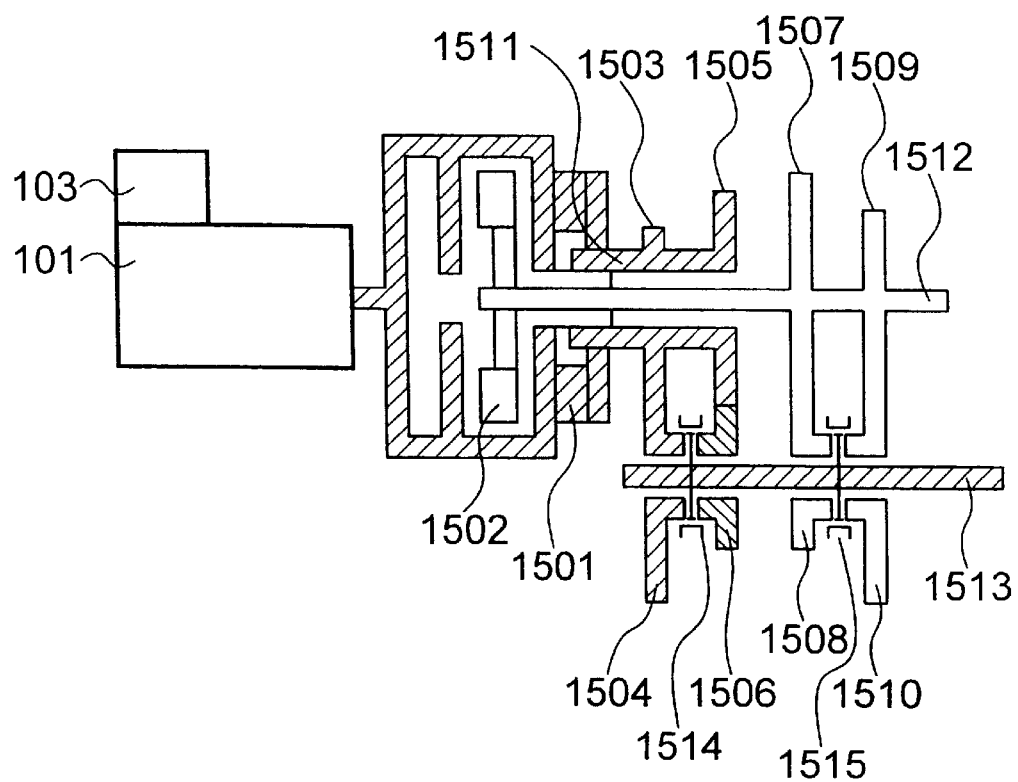
FIG. 15 is a schematic view of an example of a detailed entire configuration of an automobile using a control apparatus of the automobile according to the present invention.

Referring to FIG. 15, there is shown an example of a detailed entire configuration of an automobile using a control apparatus for the automobile according to the present invention. The automatic transmission in this illustration has a structure in which power from the engine 101 can be divided into two for a first clutch 1501 and for a second clutch 1502 before-input. At all times a 1-speed drive gear 1503 engages with a 1-speed driven gear 1504 and a 3-speed drive gear 1505 engages with a 3-speed driven gear 1506, while the 1-speed drive gear 1503 and the 3-speed drive gear 1505 rotate together with a first input shaft 1511 if the first clutch 1501 is fastened. The 1-speed driven gear 1504 and the 3-speed driven gear 1506 are fastened to an output shaft 1513 through a 1- to 3-speed dog clutch 1514 to transmit the power to a tire. At all times a 2-speed drive gear 1509 engages with a 2-speed driven gear 1510 and a 4-speed drive gear 1507 engages with a 4-speed driven gear 1508, while the 2-speed drive gear 1509 and the 4-speed drive gear 1507 rotate together with a second input shaft 1512 if the second clutch 1502 is fastened. The 2-speed driven gear 1510 and the 4-speed driven gear 1508 are fastened to the output shaft 1513 through a 2- to 4-speed dog clutch 1515 to transmit the power to a tire. In a gear change (for example, 1-speed to 2-speed), the 2-speed driven gear 1510 is fastened from the 1-speed running condition and then the first clutch 1501 is released and the second clutch 1502 is fastened. After that, the 1-speed driven gear 1504 is released. If a torque capacity becomes low due to a deterioration of the first clutch 1501 or the second clutch 1502 in this automatic transmission, perform a control operation as shown in FIG. 16.

Referring to FIG. 16, there is shown an example of a control flowchart before the gear change. Processing in this flowchart is started at a fixed period on the timer (for example, 10 [ms]). Whether the gear change command is issued is determined in step S1601; none is executed unless the command is issued or otherwise the processing progresses to step S1602. In the step S16002, it is determined whether the current output shaft torque CTo is equal to or smaller than the limit transmission output shaft torque Tq1max obtained by multiplying a torque capacity of a target geared clutch selected out of the first clutch and the second clutch by a target gear ratio. If the current output shaft torque is greater than the limit transmission output shaft torque, the processing progresses to step S1605 to control the engine torque so that the current output shaft torque decreased to the limit transmission output shaft torque or smaller. If the current output shaft torque is equal to or smaller than the limit transmission output shaft torque, the processing progresses to step S1603 to shift to the engine torque control under the gear change and the exchange control between the first clutch and the second clutch is started in step S1604. This results in a smooth change of the output shaft torque, thereby enabling a smooth gear change even if the output shaft torque before the gear change is greater than the limit transmission output shaft torque.

What is claimed is:

1. A control apparatus of an automatic transmission having torque transmission means between an input shaft and output shaft of a gear transmission with said torque transmission means on at least one gear change stage serving as a friction clutch and said torque transmission means on other gear change stages serving as claw clutches, for controlling said friction clutch at a gear change from one gear change stage to another, wherein, if output shaft torque after said claw clutch not clawed on the other gear change stages is clawed is below target output shaft torque based on an accelerator pedal opening, engine torque is controlled so that said output shaft torque is able to reach a target output shaft torque.

2. A control apparatus of an automatic transmission according to claim 1, wherein, after said output shaft torque of the transmission substantially coincides with said target output shaft torque based on an accelerator pedal position, said engine torque is controlled in accordance with said target output shaft torque based on said accelerator pedal position.

3. A control apparatus of an automatic transmission according to claim 1 wherein a throttle is configured to control the engine torque.

4. A control apparatus of an automatic transmission according to claim 1, wherein means for ignition timing is configured to control the engine torque.

5. A control apparatus of an automatic transmission according to claim 1, wherein means is provided for controlling the engine torque to make the output shaft torque of said transmission direct-linearly near to the target output shaft torque based on accelerator pedal position.

6. A control apparatus of an automatic transmission according to claim 1, wherein means is provided for controlling the engine torque to have the output shaft torque of said transmission approximate the target output shaft torque based on accelerator pedal position with a primary delay.

7. A control apparatus of an automatic transmission according to claim 1, wherein sensed vehicle acceleration is utilized to control the engine torque.

8. A control apparatus of an automatic transmission according to claim 1, wherein, after a predetermined period of time has elapsed from beginning of gear change, sensed acceleration position is utilized to control the engine torque in accordance with the target output shaft torque.

9. A control apparatus for controlling a transmission, comprising a transmission input shaft, a transmission output shaft and means for transmitting torque from the transmission input shaft to the transmission output shaft by clawing before and after gear-changing and otherwise by friction, wherein when an output shaft torque of said transmission before gear-changing is larger than that of capable of being transmitted by the friction, engine torque is controlled such that said output shaft torque is in a range of torque capable of being transmitted by the friction.

10. A control apparatus according to claim 9, wherein, when said output shaft torque is below a target output shaft torque based on an accelerator pedal position, engine torque is controlled so as to have said output shaft torque substantially coincide with said target output shaft torque based on said accelerator pedal position.

11. A control apparatus according to claim 10, wherein, when said output shaft torque substantially coincides with said target output shaft torque based on said accelerator pedal position, engine torque is controlled in accordance with the target output shaft torque based on said accelerator pedal position.

12. A control apparatus according to claim 9, wherein a throttle is utilized to control engine torque.

13. A control apparatus according to claim 7, wherein ignition timing is utilized to control engine torque.

14. A control apparatus according to claim 10, wherein means is provided to control engine torque such that said output shaft torque is linearly near said target output shaft torque based on said accelerator pedal position.

15. A control apparatus according to claim 10, wherein means is provided to control engine torque to bring said output shaft torque near to said target output shaft torque based on said accelerator pedal position with a primary delay.

16. A control apparatus according to claim 9, wherein sensed vehicle acceleration is utilized to control engine torque.

17. A control apparatus according to claim 10, wherein means is provided to control engine torque such that, after a predetermined time has elapsed from beginning of a gear-change, engine torque is controlled in accordance with said target output shaft torque based on said accelerator pedal position.

* * * * *